United States Patent [19]
Hoshino

[11] 4,111,575
[45] Sep. 5, 1978

[54] TUBE COUPLING

[76] Inventor: Masao Hoshino, 32-6107 Mitsuike, Shiroyama-cho, Owariasahi-shi, Aichi, Japan

[21] Appl. No.: 758,164

[22] Filed: Jan. 10, 1977

[30] Foreign Application Priority Data

Jun. 11, 1976 [JP] Japan ............... 51-076506[U]

[51] Int. Cl.² ............................................. F16B 7/10
[52] U.S. Cl. .................... 403/104; 403/373; 403/377; 248/413
[58] Field of Search ............. 403/110, 109, 104, 377, 403/373, 366; 248/413, 411, 333; 285/298, 302, 404

[56] References Cited

U.S. PATENT DOCUMENTS

| | | | |
|---|---|---|---|
| 1,309,375 | 7/1919 | Taylor | 248/413 |
| 1,836,348 | 12/1931 | Wardell | 403/366 |
| 2,327,990 | 8/1943 | Benson | 403/366 |
| 2,710,207 | 6/1955 | Mueller | 403/373 |

FOREIGN PATENT DOCUMENTS

512,777  12/1937  United Kingdom ............... 403/373

*Primary Examiner*—Andrew V. Kundrat
*Attorney, Agent, or Firm*—Ostrolenk, Faber, Gerb & Soffen

[57] ABSTRACT

Tube coupling for coupling an inner and an outer tube, wherein the inner tube extends into the outer tube and projects out of the terminal end of the outer tube: a receiving member with one sleeve portion that receives the terminal end of the outer tube to be coupled and another sleeve portion around the inner tube; a split tightening ring is held inside the receiving member, is anchored in the receiving member against shifting around in it and is squeezable against the outside of the inner tube; the split tightening ring has tabs that are squeezed together to squeeze the ring against the inner tube.

7 Claims, 7 Drawing Figures

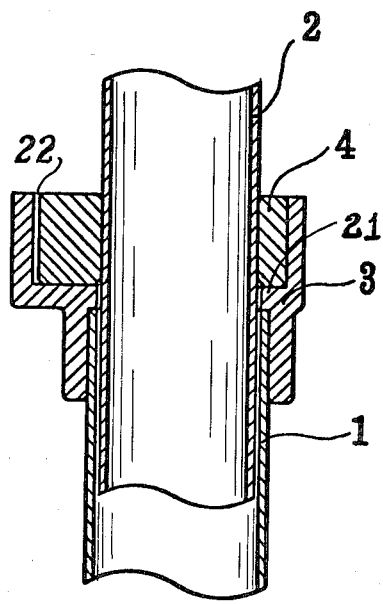
FIG. 3
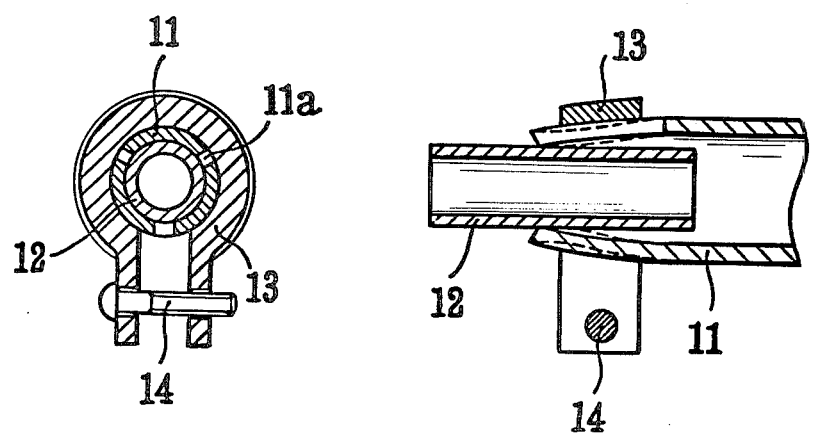
FIG. 4
(PRIOR ART)
FIG. 5
(PRIOR ART)

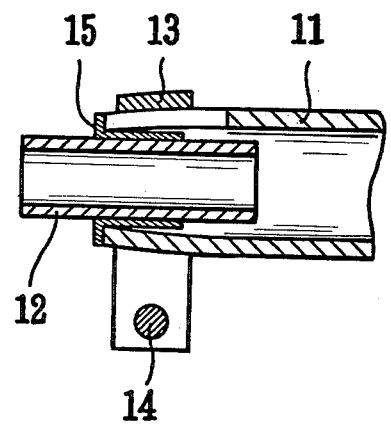
FIG-6-
(PRIOR ART)
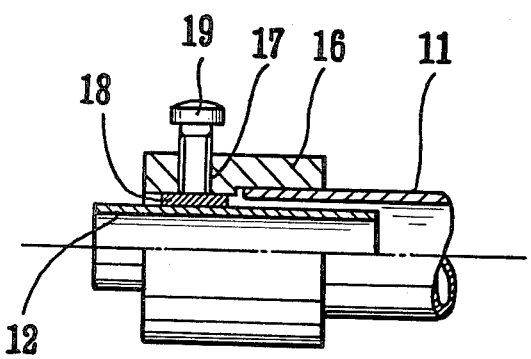
FIG-7-
(PRIOR ART)

TUBE COUPLING

FIELD OF THE INVENTION

This invention relates to a tube coupling which securely couples two telescopable, relatively rotatable tubes.

BACKGROUND OF THE INVENTION

A seamless tube or pipe, which is normally used in a telescoping tube coupling, is generally round at both of its interior and exterior. However, in the case of welded tubes or pipes, the interior is sometimes out of round because of a trace of a welding bead left thereon. With a welded tube or pipe, therefore, a coupling which operates upon the interior of one of the tubes or pipes is undesirable.

With telescoping tubes or pipes, it is desirable that the interior of the outer tube and the exterior of the inner tube be as close as possible in size to facilitate secure coupling.

A coupling device for a telescoping tube arrangement should meet the requirements that (1) the coupling does not scratch the tubes being coupled, (2) no noises are generated by the coupling at the time that the tubes are telescoped into or out of each other, and (3) the coupling accurately and firmly stops relative axial shifting and relative tangential rotation of the coupled tubes using a comparatively small force.

SUMMARY OF THE INVENTION

Accordingly, the invention has as its objects the realization of the above stated requirements for a tube coupling device.

It is a further object of the invention to provide a simple, easily assembled tube coupling device.

The coupling device according to the invention couples two telescopable tubes, wherein an inner tube telescopes into and out of and is relatively rotatable with respect to an outer tube. The outer diameter of the inner tube closely approximates the inner diameter of the outer tube, that the tubes might be coupled together without rocking. Yet, the cross-sectional dimensions of the tubes are different enough to enable them to telescope and tangentially rotate.

The coupling of the invention is beneficially used when the coupled tubes are oriented with their axes vertical and with the outer tube being beneath the inner tube. One particular application of the coupling is in connection with supporting musical instruments. However, there is certainly no limitation on the uses and applications for the coupling or the orientations of the tubes of the coupling.

The coupling comprises a sleeve like receiving member which is applied over the tubes in the vicinity of the terminal end of the outer tube. The receiving member includes an outer tube engaging first sleeve portion which extends over the outer tube in the region of its terminal end. The first sleeve portion has an internal diameter selected such that the first sleeve portion is press fit over the outer tube. The receiving member also includes a second inner tube engaging sleeve portion which extends over the section of the inner tube near the terminal end of the outer tube. The internal diameter of the second sleeve portion of the receiving member is greater than the outer diameter of the inner tube.

A tightening ring is interposed around the exterior of the inner tube and inside the second sleeve portion of the receiving member. The tightening ring is a split ring which is normally resiliently biased open. The ring is anchored to the receiving member at a location on the ring spaced away from the split apart end portions thereof. Such anchoring may be by engagement between a first engagement formation located on the ring away from the split ends thereof and a second engagement formation on the interior surface of the second sleeve portion. Alternatively, there could be only one engagement formation on one of the ring and the second sleeve portion for engaging the other one of those elements.

Ring tightening means engage at least one of the end portions or end tabs of the split ring to squeeze the end portions toward each other. The tightening means are attached to the receiving member and preferably engage one end portion of the split tightening ring to urge it toward the other end portion and tighten the ring closed around the inner tube, thereby securely engaging the inner tube and coupling the tubes together.

The coupling according to the invention avoids damage to both of the inner and the outer surfaces of both of the coupled tubes. There is no obstacle to secure coupling, even when a truly round shape tube is not available to be coupled because, for instance, of the presence of a welding bead, etc. on the surface of the inner diameter. Furthermore, the invention has the benefit of minimizing the diametric differences that must be present between the diameters of the tubes being coupled, with the resultant benefit of reducing the clamping force that has to be applied.

The above stated objects and the invention will be better understood from the following description of the prior art and the following detailed description of a preferred embodiment of the invention.

BRIEF DESCRIPTION OF THE DRAWINGS

FIG. 3 is a cross-sectional side view of the coupling along the line and in the direction of arrows B—B in FIG. 2;

FIG. 4 is a cross-sectional plan view of one example of a prior art coupling;

FIG. 5 is a side elevational view in cross-section of the embodiment of prior art coupling shown in FIG. 4;

FIG. 6 is a cross-sectional side view of a modified embodiment of the prior art coupling shown in FIG. 5; and FIG. 7 is a side elevational view, partially in cross-section, showing yet another example of a prior art coupling.

DETAILED DESCRIPTION OF PRIOR ART EMBODIMENTS

Figure 1:
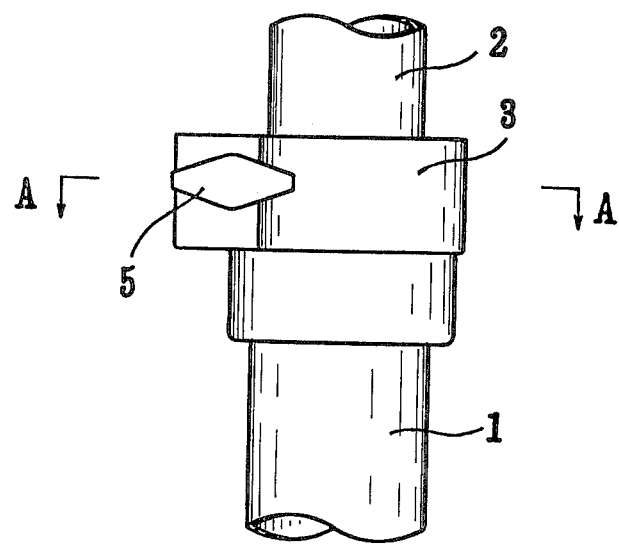
FIG. 1 is a side elevational view of a tube coupling according to the present invention.

Referring to the first embodiment of a prior art coupling shown in FIGS. 4 and 5, an inner tube 12 is inserted into a somewhat wider outer tube 11. In order to permit the illustrated deflection of the end portion of the outer tube toward the inner tube for clamping the inner tube, a plurality of grooves, e.g. three, are cut in from the terminal end of the outer tube 11. The outer periphery of the terminal end portion of the tube 11 is covered with a split ring tightening member 13. Tightening of the tightening member is effected by a tightening screw extending between the ends of the split ring to draw it together.

The spacing between the internal diameter of the outer tube and the external diameter of the inner tube requires that a comparatively large tightening force be applied to the outer tube in order to bring it into contact with the inner tube. Further, the outer tube is in virtually line contact, rather than in tubular contact, with the inner tube, thus requiring that great tightening force be applied against the outer tube to tighten it against the inner tube. Further, with this arrangement, the outer peripheral surface of the inner tube is damaged by contact with the inner surface of the outer tube, especially where the tubes are comprised of metal and the welding bead on the interior of the outer tube damages the inner tube.

The prior art coupling device of FIG. 6 was developed to avoid the damage caused to the exterior of the inner tube by the interior of the outer tube. In this case, a protective ring 15 of plastic, or the like protective material, is inserted as a stopper over and into the terminal end portion of the outer tube 11. In particular, the protective ring 15 covers the contact area between the outer tube 11 and the inner tube 12. However, the diametric difference between the tubes 11 and 12 is enlarged by the thickness of the ring 15, necessitating that the force that is applied to the outer tube 11 to tighten it against the inner tube 12 be correspondingly increased.

The coupling of FIG. 7 includes an external metallic sleeve 16 with an opening at one longitudinal side for receiving, in press fit or tight fit manner, the terminal end portion of the outer tube and with a smaller diameter continuation of the opening at the other longitudinal side of sleeve 16 through which the portion of the inner tube, which is just beyond the terminal end of the outer tube, extends. A padding plate of plastic or metal is emplaced in the second opening between the interior of the sleeve 16 and the exterior of the inner tube 12. A tightening screw 19 is tightened through the sleeve 16 and against the pad 18 to press upon the inner tube 12. With this arrangement, however, the inner tube 12 is deformed somewhat concavely by the tightening force exerted by the screw 19. Moreover, it becomes difficult to effect accurate securement of the tubes 11 and 12.

DETAILED DESCRIPTION OF A PREFERRED EMBODIMENT

The coupling according to the present invention overcomes the drawbacks of the prior art and in particular avoids damage to either of the inner and outer tubes. It is not dependent upon the method by which the tubes were fabricated and in particular with whether there is any weld bead on either of the tubes. Further, the difference in the diameters of the telescoping tubes can be quite small, effectively reducing the force required to clamp the inner and outer tubes together.

Figure 2:
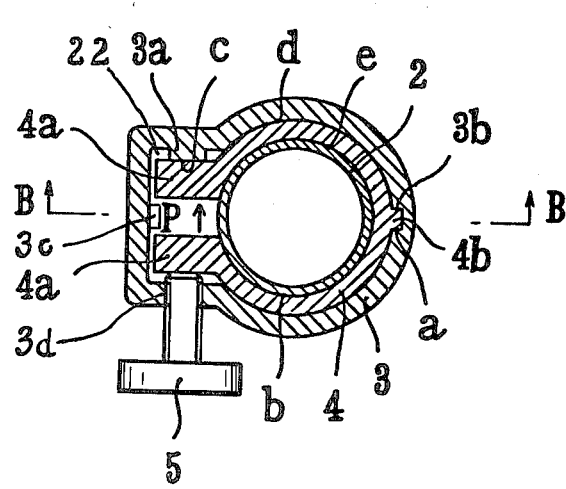
FIG. 2 is a cross-sectional plan view through the coupling of the invention along the line and in the direction of arrows A—A in FIG. 1.

Now referring to FIGS. 1-3, the invention is directed to fixedly coupling an outer tube 1 and an inner tube 2. The materials of which the tubes are comprised are a matter of choice. In one embodiment, they are metal pipes. Typically, the tubes are rigid. The inner tube 2 extends into the terminal, upper end of the outer tube 1. The inner diameter of the outer tube 1 and the outer diameter of the inner tube 2 are quite close, but there is a sufficient difference to enable these tubes to be axially telescoped and tangentially rotated with respect to each other.

A receiving member 3 comprised of metal or other rigid material is provided. It has two concentric sleeve portions, including a first, lower sleeve portion extending over the terminal end portion of the outer tube and a second, upper sleeve portion extending over the exterior of the inner tube away from the terminal end of the outer tube. The two sleeve portions of the receiving member 3 are separated at the central annular rib 21. As shown in FIG. 2, in transverse cross-section, both sleeve portions of the receiving member 3 are circular around the interior of member 3. The second upper sleeve portion has a widened, non-circular chamber 22 shown at the left in FIG. 2, which cooperates with the below described tightening ring 4 for securing the inner tube 2.

At one of the side walls of the widened chamber 22 of the receiving member 3, there is a protruding abutment 3a for engaging the outside of one end portion or tab 4a of the below described split tightening ring 4. In the interior of the curve of the second sleeve portion of the receiving member, there is a ring engagement formation, i.e. the vertical groove 3b, for engaging a receiving member engagement formation, i.e. a protrusion 4b from the tightening ring 4, to guide and position that ring. The positions of groove 3b and protrusion 4b may be exchanged so long as the ring 4 is properly anchored. There may be a protrusion 3c in the end wall of the widened chamber 22 of the receiving member 3 which also guides and positions the tightening ring 4.

A threaded opening 3d is defined in the side wall of the receiving member chamber 22 and aligned with the protrusion 3a for receiving the below described tightening screw 5.

As shown in FIG. 3, the outer tube 1 is press fit in the lower first sleeve portion of the receiving member 3 and the terminal end of tube 1 is moved up to the dividing rib 21 of the receiving member 3. This holds the receiving member 3 to the outer tube 1.

As shown in FIGS. 2 and 3, a tightening ring of plastic, light metal or other resilient material is inserted in the space inside the upper second sleeve portion of the receiving member 3 around the inner tube 2. This space and the tightening ring 4 are cooperatively shaped and sized such that the tightening ring substantially fills the space. In the rounded portion of the receiving member 3, the tightening ring 4 completely fills the space between the inner tube 2 and the interior of the receiving member 3. The tightening ring 4 is a split ring and its free end portions comprise two outwardly projecting ring tightening tabs 4a which extend into the widened chamber 22. The tabs 4a are normally spaced apart and are normally resiliently biased apart by the ring 4 to return to their spaced apart condition. One of the tabs 4a is normally biased to rest against the protrusion 3a inside the chamber 22. The other tab is normally biased by the resilience of ring 4 against the below described tightening member 5. At the rounded end of the tightening ring 4, the protrusion 4b is defined, and it is shaped and positioned to be received in the groove 3b in the interior of the receiving member 3.

The tightening screw 5 is inserted into the opening 3d in the receiving member 3. Screw 5 engages one of the tabs 4a of the split ring 4. Tightening of the screw 5 compresses the tabs 4a of the split ring 4 toward each other.

The coupling device functions and operates in the following manner.

Screw 5 is tightened. This moves the lower tab 4a in FIG. 2 upwardly in the direction of the arrow. Because the lower surface a of the protrusion 4b of the ring 4 is supported in position in the groove 3b, the tightening of the screw 5 compresses the lower surface b of the inner pipe 2. The screw 5 also applies pressure to the upper tab 4a of the ring 4 in FIG. 2 through contact of the surface c of the ring 4 with the facing surface of the protrusion 3a. The protrusion 4b in groove 3b precludes rotation of the ring 4, whereby the pressure on the surface c on the ring 4 produces pressure of the ring 4 against the arcuate inner surface d of the receiving member 3. As a result, the reaction force presses against the outer surface e of the inner tube 2.

In summary, the outer tube 1 is pressed into and is secured in the first lower section of the receiving member 3. The inner tube 2 is fixed together with the receiving member 3 and with the tightening ring 4 as one integral body, through tightening of the tightening ring 4. When the ring 4 is sufficiently tightened by the screw 5, telescoping and relative rotation of the tubes 1, 2 are no longer possible.

When the tightening screw 5 is loosened, the compressive securement between the tightening ring 4 and the receiving member 3 is released. This releases the inner tube 2. Telescoping and relative rotation of the tubes is now possible.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A coupling for coupling two telescopable tubes, wherein an inner tube is telescopable into an outer tube and the outer tube has a terminal end out of which the inner tube projects, said coupling comprising:
   a receiving member emplaceable over the terminal end of the outer tube and over the section of the inner tube near the terminal end of the outer tube; said receiving member having a first sleeve portion with a first interior surface; said first sleeve portion first interior surface being generally circular in cross-section; said first interior surface extending over and being engageable with the exterior of the outer tube at and away from the terminal end of the outer tube;
   said receiving member having a second sleeve portion with a second interior surface; said second sleeve portion second interior surface being generally circular in cross-section; said second interior surface extending over the section of the inner tube that extends away from the terminal end portion of the outer tube;
   a tightening ring of generally circular cross-section emplaced inside said second sleeve portion and engageable with the exterior of the inner tube; said tightening ring being a split ring and terminating at end portions at both sides of the split in said split ring; said ring end portions each comprising a tab projecting away from said ring in generally the same direction and said tabs having side faces and said side faces thereof being opposed and spaced apart;
   ring tightening means in said receiving member and extending into engagement with at least one said ring end portion tab for biasing said ring end portions toward each other;
   respective engagement formations on said ring and also on said second interior surface at a location on said ring remote from said end portions thereof; said engagement formations being in engagement such that said ring is held stationary by means of the engagement of said engagement formations against movement around said receiving member and around the inner tube in said receiving member as said tightening means tightens said ring end portions toward each other;
   an abutment in said receiving member second sleeve portion for being engaged by and for blocking said other ring end portion from moving away from said one ring end portion as said tightening means moves said one ring end portion toward said other ring end portion; said tightening means being engageable with said one ring end portion to urge it toward said other ring end portion thereby to urge said ring end portions toward each other;
   said second sleeve portion having a chamber therein shaped to receive both said ring end portion tabs and said tabs being in said chamber; said abutment for engaging said other ring end portion being in said chamber.

2. The coupling of claim 1, wherein said engagement formations comprise a groove in one of said ring and said second interior surface and a protrusion engageable in the said groove and located in the other of said ring and said second interior surface.

3. The coupling of claim 1, wherein said engagement formation groove is in said second interior surface of said second sleeve portion and said engagement formation protrusion is on said ring and extends into said groove.

4. The coupling device of claim 1, wherein said tightening ring is resilient and normally urges its said end portions apart.

5. The coupling device of claim 1, wherein said tightening means comprise a rotatably movable screw in and supported by said receiving member.

6. In combination, the coupling device of claim 1 and an inner and an outer tube, with said inner tube being telescopable into and being rotatable with respect to said outer tube; said outer tube being shaped and sized to be fitted in and being received and fitted in said first sleeve portion interior surface; said inner tube being received in said second sleeve portion;
   said ring engaging said inner tube.

7. The coupling device of claim 1, further comprising a separating rib located inside said receiving sleeve and separating said first and said second sleeve portions and for being engaged by the terminal end portion of said outer tube.

* * * * *